(12) United States Patent
Horiyama

(10) Patent No.: US 7,426,045 B2
(45) Date of Patent: Sep. 16, 2008

(54) INFORMATION PROCESSING APPARATUS FOR MANAGING PRINT JOB, AND METHOD THEREOF

(75) Inventor: Jun Horiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 914 days.

(21) Appl. No.: 10/390,887

(22) Filed: Mar. 19, 2003

(65) Prior Publication Data
US 2003/0182368 A1  Sep. 25, 2003

(30) Foreign Application Priority Data
Mar. 19, 2002  (JP) .............................. 2002-076756

(51) Int. Cl.
*G03G 15/00* (2006.01)
*G06K 15/00* (2006.01)

(52) U.S. Cl. .................... 358/1.13; 358/1.14; 358/1.15; 399/24; 399/82; 399/85

(58) Field of Classification Search ............... 358/1.13, 358/1.14, 1.15; 399/82, 85, 24
See application file for complete search history.

(56) References Cited

U.S. PATENT DOCUMENTS

| 5,774,654 | A  | * | 6/1998  | Maki ........................... 709/200 |
| 6,202,092 | B1 | * | 3/2001  | Takimoto .................... 709/225 |
| 6,549,299 | B1 | * | 4/2003  | Allen et al. ................ 358/1.18 |
| 6,647,213 | B2 | * | 11/2003 | Takeda ........................ 399/12 |
| 6,972,857 | B2 | * | 12/2005 | Mantell et al. ............. 358/1.14 |
| 7,092,963 | B2 | * | 8/2006  | Ryan et al. ................ 707/104.1 |
| 2001/0054152 | A1 | * | 12/2001 | Nakao et al. ................ 713/182 |

FOREIGN PATENT DOCUMENTS

| JP | 9-218622     | 8/1997  |
| JP | 3048510      | 2/1998  |
| JP | 10-161823 A  | 6/1998  |
| JP | 11-095937    | 4/1999  |
| JP | 11-221945    | 8/1999  |
| JP | 2000-047534  | 2/2000  |
| JP | 2000-108464  | 4/2000  |
| JP | 2001-86330   | 3/2001  |
| JP | 2001-175439  | 6/2001  |
| JP | 2001-282475  | 10/2001 |
| JP | 2001-297045  | 10/2001 |

* cited by examiner

*Primary Examiner*—Edward L. Coles, Sr.
*Assistant Examiner*—Chan S Park
(74) *Attorney, Agent, or Firm*—Fitzpatrick, Cella, Harper & Scinto

(57) ABSTRACT

Disclosed are, as an embodiment, an information processing apparatus connectable to an image processing apparatus, including a first setting unit for setting the first limitation condition for limiting the use of the image processing apparatus, a second setting unit for setting whether to inhibit the use upon reception of a use request exceeding the second limitation condition, a decision unit for deciding whether the second setting unit sets to inhibit the use upon reception of a use request exceeding the first limitation condition set by the first setting unit, and an inhibit unit for inhibiting the use of the image processing apparatus in accordance with the decision result of the decision unit, wherein the second setting unit can set to inhibit the use of the image processing apparatus so as to perform different operations between a case wherein the use request exceeds the first limitation condition but does not exceed the second limitation condition and a case wherein the use request exceeds the first and second limitation conditions, and a method, storage medium, and system which are applicable to this apparatus.

7 Claims, 12 Drawing Sheets

FIG. 9

| ITEM | CONTENT |
|---|---|
| 901 — OUTPUT DEVICE | MFP-1 |
| 902 — JOB INFORMATION ACQUISITION METHOD | DEVICE JOB LOG |
| 903 — TIME | 1999/11/01 pm5 GMT |
| 904 — SHEET TYPE | OHP |
| 905 — NUMBER OF PAGES | 7 |
| 906 — NUMBER OF COPIES | 4 |
| 907 — SHARED PRINTER | NO |
| 908 — ISSUER | TARO YAMADA |
| 909 — MODE | COLOR |

FIG. 11A

SETTING OF UPPER LIMIT VALUE

GROUP NAME: PLANNING DEPARTMENT — 101
COLOR: 100 SHEETS — 102
MONOCHROME: 1000 SHEETS — 103

SET — 104    CANCEL — 105

FIG. 11B

WHEN COLOR PRINTING EXCEEDS UPPER LIMIT VALUE,
☐ PERMIT
☐ PERMIT AND SEND WARNING MAIL
☑ NOT PERMIT
— 106

OK — 107    CANCEL — 108

FIG. 11C

WHEN MONOCHROME PRINTING EXCEEDS UPPER LIMIT VALUE,
☐ PERMIT
☑ PERMIT AND SEND WARNING MAIL
☐ NOT PERMIT
— 109

OK — 110    CANCEL — 111

FIG. 11D

SETTINGS ARE COMPLETED.

THE USER IS PERMITTED TO PRINT DATA EVEN IF COLOR PRINTING EXCEEDS 100 SHEETS, BUT WARNING MAIL IS SENT TO THE USER.

IF MONOCHROME PRINTING EXCEEDS 1,000 SHEETS, THE USER IS NOT PERMITTED TO PRINT DATA.

OK

US 7,426,045 B2

INFORMATION PROCESSING APPARATUS FOR MANAGING PRINT JOB, AND METHOD THEREOF

FIELD OF THE INVENTION

The present invention relates to an information processing apparatus for managing a print job, and a method thereof.

BACKGROUND OF THE INVENTION

There have conventionally been known information processing apparatuses which manage jobs when the user uses via a network a peripheral device such as a printer (printing apparatus), a scanner, a copying machine, or a multifunctional peripheral (MFP) serving as a combination of them.

One of these information processing apparatuses is an apparatus which puts a limitation on using a peripheral device by the user beyond a predetermined limit, as disclosed in, e.g., Japanese Patent Laid-Open No. 10-161823. More specifically, this reference discloses a technique of setting, for general and special printing modes, upper limit values by which a printing apparatus can print data.

The prior art gives few degrees of freedom to the use limitation, and cannot meet a particular need of the user.

SUMMARY OF THE INVENTION

Accordingly, one feature of the present invention is to provide an information processing apparatus and information processing system capable of finely setting a use limitation.

According to the present invention, the foregoing object is attained by providing an information processing apparatus connectable to an image processing apparatus, comprising: first setting means for setting a first limitation condition for limiting use of the image processing apparatus; second setting means for setting whether to inhibit the use upon reception of a use request exceeding a second limitation condition; decision means for deciding whether the second setting means sets to inhibit the use upon reception of a use request exceeding the first limitation condition set by the first setting means; and inhibit means for inhibiting the use of the image processing apparatus in accordance with a decision result of the decision means, wherein said second setting means can set to inhibit the use of the image processing apparatus so as to perform different operations between a case wherein the use request exceeds the first limitation condition but does not exceed the second limitation condition and a case wherein the use request exceeds the first and second limitation conditions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a table showing an example of one job information registered in the job log database in the job account system according to the embodiment of the present invention;

FIGS. 11A to 11D are views showing an example of a use limitation setting window in the job account system according to the embodiment of the present invention.

DETAILED DESCRIPTION OF THE PREFERRED EMBODIMENT

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

(Embodiment)

An embodiment of the present invention will be described in detail below with reference to the accompanying drawings.

<Job Account System>

Figure 1:
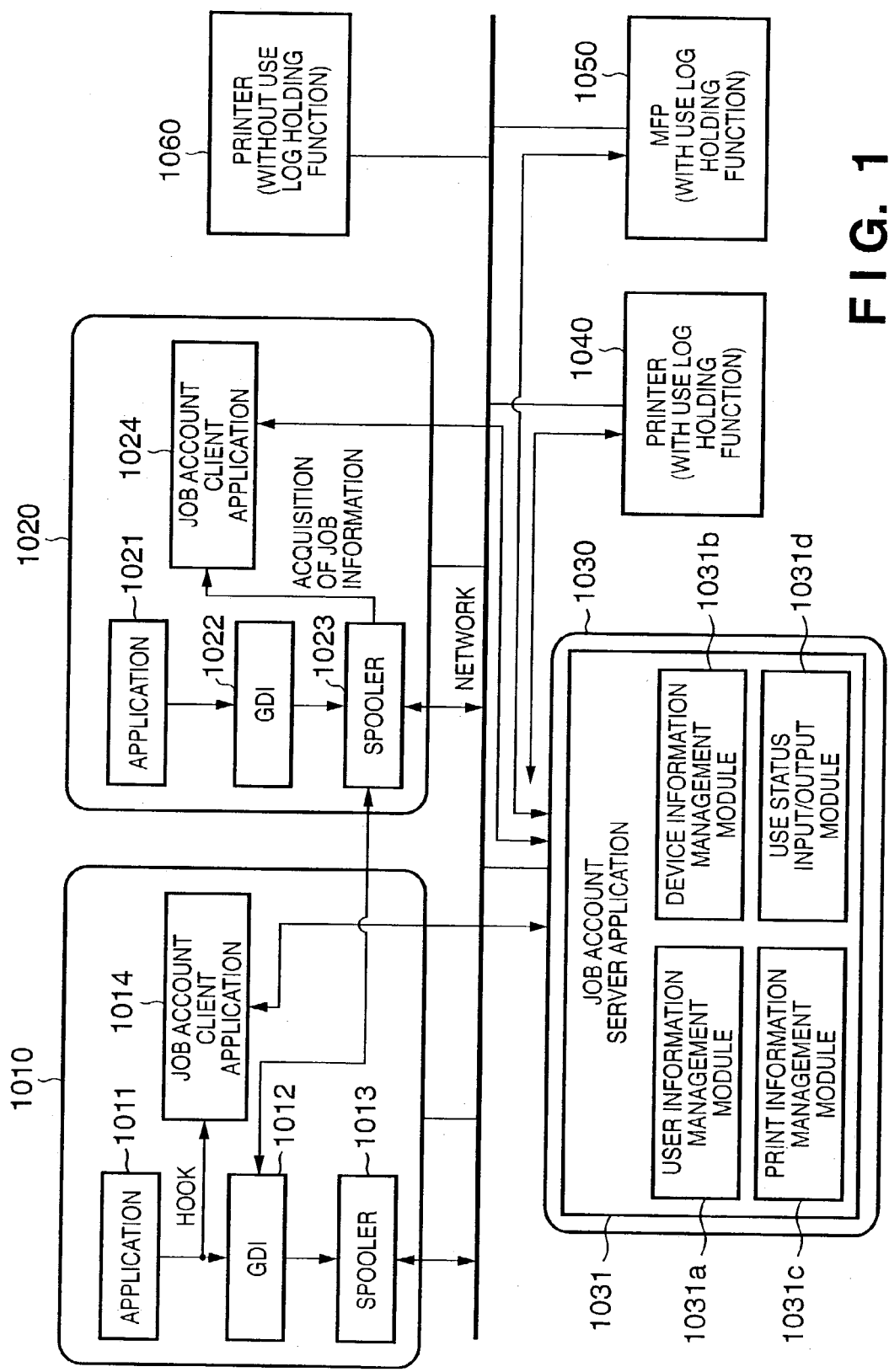
FIG. 1 is a block diagram showing the basic arrangement of a whole job account system according to an embodiment of the present invention.

FIG. 1 is a block diagram showing the basic arrangement of a whole job account system according to this embodiment. Reference numerals 1010 and 1020 denote client computers; and 1030, a server computer as an information processing apparatus.

Reference numerals 1040 and 1060 denote printers. The printer 1040 comprises a function of holding a printing log (use log holding function), whereas the printer 1060 does not have any use log holding function. Reference numeral 1050 denotes an MFP (Multi-Function Printer). The MFP 1050 has a printer function, copying function, scanner function, and use log holding function.

The computers 1010, 1020, and 1030 and the printers 1040, 1050, and 1060 can communicate with another device via a network.

In the client computer 1010, an application 1011 invokes a GDI (Graphical Device Interface) 1012, and the GDI 1012 generates print data in accordance with an instruction from the application 1011 and transmits the print data to a spooler 1013. A job account client application 1014 monitors (hooks) the application 1011 invoking the GDI 1012, and accumulates job information on the print data. The job information includes the number of print sheets, the number of pages, the print size, the type of paper for use, information (user information) about the user who issues a print request, and information (color information) about color printing.

The spooler 1013 communicates with a peripheral device (printer 1040, MFP 1050, and printer 1060) via a network, and if the peripheral device is ready, transmits print data. When the client computer 1020 functions as a printing server, print data generated by the GDI 1012 is transmitted to a spooler 1023.

The job account client application 1014 periodically transmits the accumulated job information to a job account server application 1031.

In the client computer 1020, an application 1021, a GDI 1022, and the spooler 1023 operate similarly to the application 1011, GDI 1012, and spooler 1013, respectively.

A job account client application 1024 periodically monitors the spooler 1023. If a print job is spooled in the spooler 1023, the job account client application 1024 acquires information of the print job by using an API (Application Program Interface). More specifically, the job account client application 1024 acquires the number of discharge sheets of the print job and the number of pages. The job account client application 1024 transmits the accumulated job information to the job account server application 1031.

If the OS has a function of notifying another application of a state change of the spooler 1023, the job account client application 1024 need not periodically monitor the spooler 1023. The OS suffices to notify the job account client application 1024 that a print job has been spooled in the spooler 1023.

In the server computer 1030, the job account server application 1031 includes a user information management module 1031a, device information management module 1031b, job information management module 1031c, and use status management module 1031d. The user information management module 1031a stores and manages user information in the internal memory (not shown) of the server computer 1030.

The device information management module 1031b determines whether a peripheral device connected to the network has a job log holding function. The device information management module 1031b stores and manages, in the internal memory (not shown) of the server computer 1030, information on a device having the job log holding function and other device information.

User information contains the computer login name of a user who utilizes a peripheral device (name input by the user in order to log in to a computer), and a network login name (name input by the user in order to log in to a network system). User information is information for specifying (identifying) a user who utilizes a peripheral device. Device information includes the print speed of a peripheral device, color information, and a network address.

The job information management module 1031c receives pieces of job information from the job account client applications 1014 and 1024, and stores them in a memory. The job information management module 1031c requests log information of a peripheral device (e.g., the printer 1040) having a function of holding log information. The job information management module 1031c acquires log information via the use status input/output module 1031d. This processing may be periodically executed. When the memory capacity of the log information storage (not shown) of a peripheral device runs short, the use status input/output module may be notified of a message to this effect, and perform the above processing.

The use status input/output module 1031d acquires a use status containing a job log (job information) from a peripheral device having the job log holding function. The use status input/output module 1031d can also output a use status report (report representing a user who executes a job and the job count) to a printer or monitor serving as a peripheral device.

The manager can cause the use status input/output module 1031d to output a use status, and obtain the use status of a peripheral device. The use status input/output module 1031d outputs various use statuses on the basis of user information, device information, and printing log information which are stored in the memory. The manager instructs the use status input/output module of an output mode (output format). Note that the use status output is displayed on, e.g., the display (not shown) of the server computer 1030. Output data on the use status output may be transmitted to the client computers 1010 and 1020 to display the use status output on the displays (not shown) of the client computers.

In outputting the use status, the use amount (the number of sheets and the toner amount used for output) and the use time of a peripheral device are output for each user. The use status is output for each peripheral device operation mode (function) such as color printing or double-sided printing. The use status is output for each sheet size used or the type of sheet used.

The use fee of a peripheral device is set in device information, and the use cost is output for each peripheral device or user. Further, the use fee of each operation mode, the use fee of each sheet size, and the use fee of each type of sheet are set. Information on a specific user, a specific type of sheet, a specific operation mode, a specific peripheral device, a specific printing count, and a specific use cost is output.

The manager activates a condition setting program (not shown) contained in the job account server application 1031, and can use the user information management module 1031a and device information management module 1031b to set use limitation conditions for each function, each user, each user department, and each device used. Settable limitation conditions are items such as the use fee, the number of pages, and the number of sheets. The use status input/output module 1031d monitors and collates a set limitation (limitation information) and printing log information, and if the use exceeds the limitation, outputs a message to this effect. The message may be displayed on the screen or output by another communication such as mail.

The job information management module 1031c monitors and collates a set limitation and printing log information for each user. If the use of a given user exceeds the limitation, the job information management module 1031c causes the client computer 1010 or peripheral device itself to reject the use by the user. Alternatively, the job information management module 1031c may generate a warning to the user by display on the screen or another communication means such as mail.

<Computer Control Arrangement>

Figure 2:
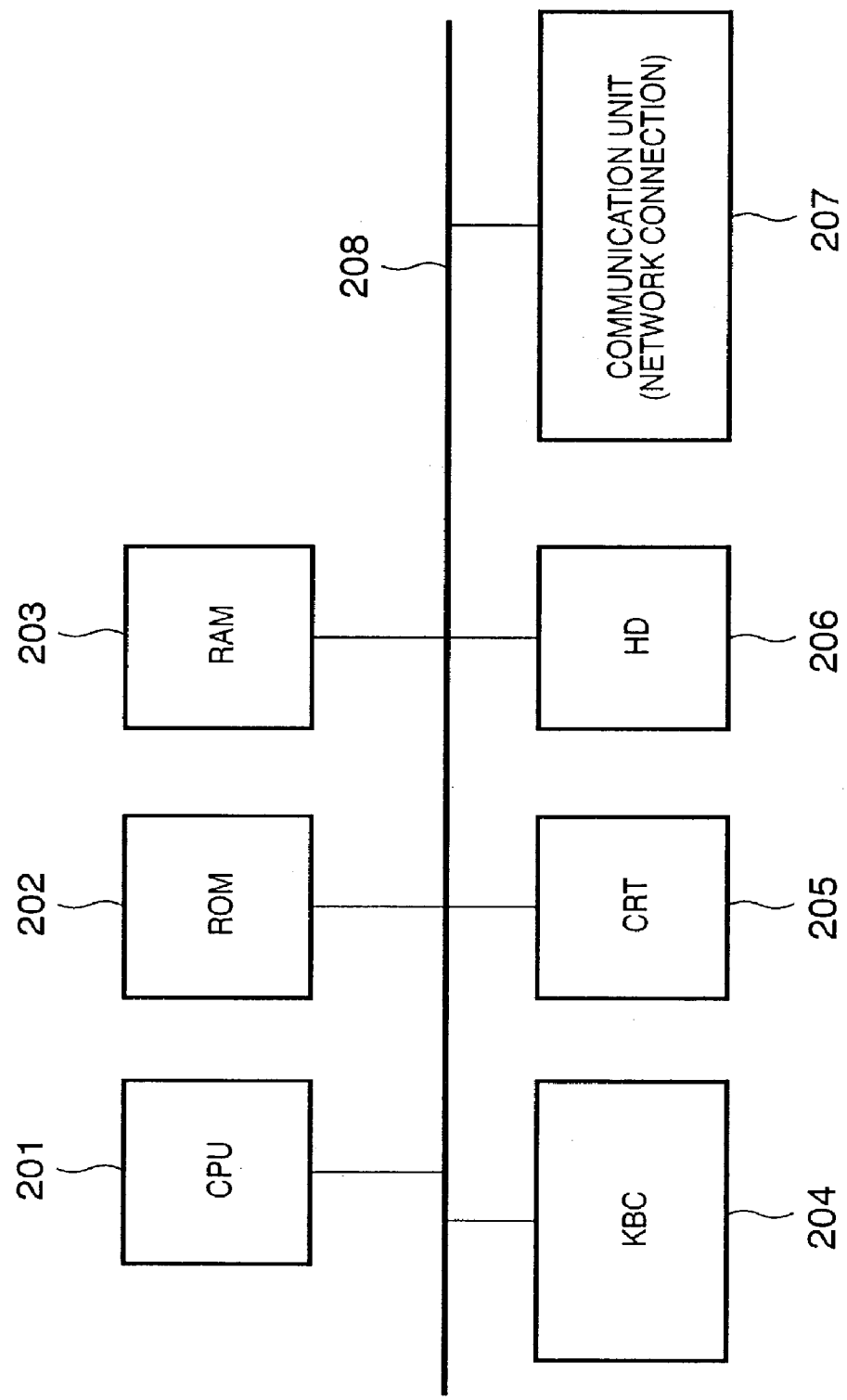
FIG. 2 is a block diagram showing the schematic arrangement of a computer included in the job account system according to the embodiment of the present invention.

FIG. 2 is a block diagram showing the hardware arrangements of the client computer 1010, client computer 1020, and server computer 1030. Reference numeral 201 denotes a CPU (Central Processing Unit). The CPU 201 performs the overall control of the computer, arithmetic processing, and the like.

Reference numeral 202 denotes a ROM (Read-Only Memory). The ROM 202 is a memory area where system startup program information and the like are stored. Reference numeral 203 denotes a RAM (Random Access Memory). The RAM 203 functions as a data memory area without any use limitation. An OS (Operating System), application program, device driver (printer driver), communication control program, and the like are loaded into the RAM 203 and executed by the CPU 201.

Reference numeral 204 denotes a KBC (Key-Board Controller). The KBC 204 receives input data from a keyboard accessory to the computer, and transfers the input data to the CPU 201. Reference numeral 205 denotes a CRT (display controller), and controls the display on a display device; and 206, an HD (Hard Disk). The HD 206 can be replaced with an external memory such as an FD (Floppy Disk) or SRAM (nonvolatile memory). The HD 206 stores programs and data, which are loaded to the RAM, as needed. For example, the internal HD of the server computer 1030 stores user information, device information, and printing log information (job log database).

Reference numeral 207 denotes a communication unit which controls network communication. The communication unit 207 allows the computer to communicate with another computer and peripheral device connected to the network.

Reference numeral 208 denotes a system bus. Data exchanged between these building components pass through the system bus 208.

<Memory Map>

Figure 3:
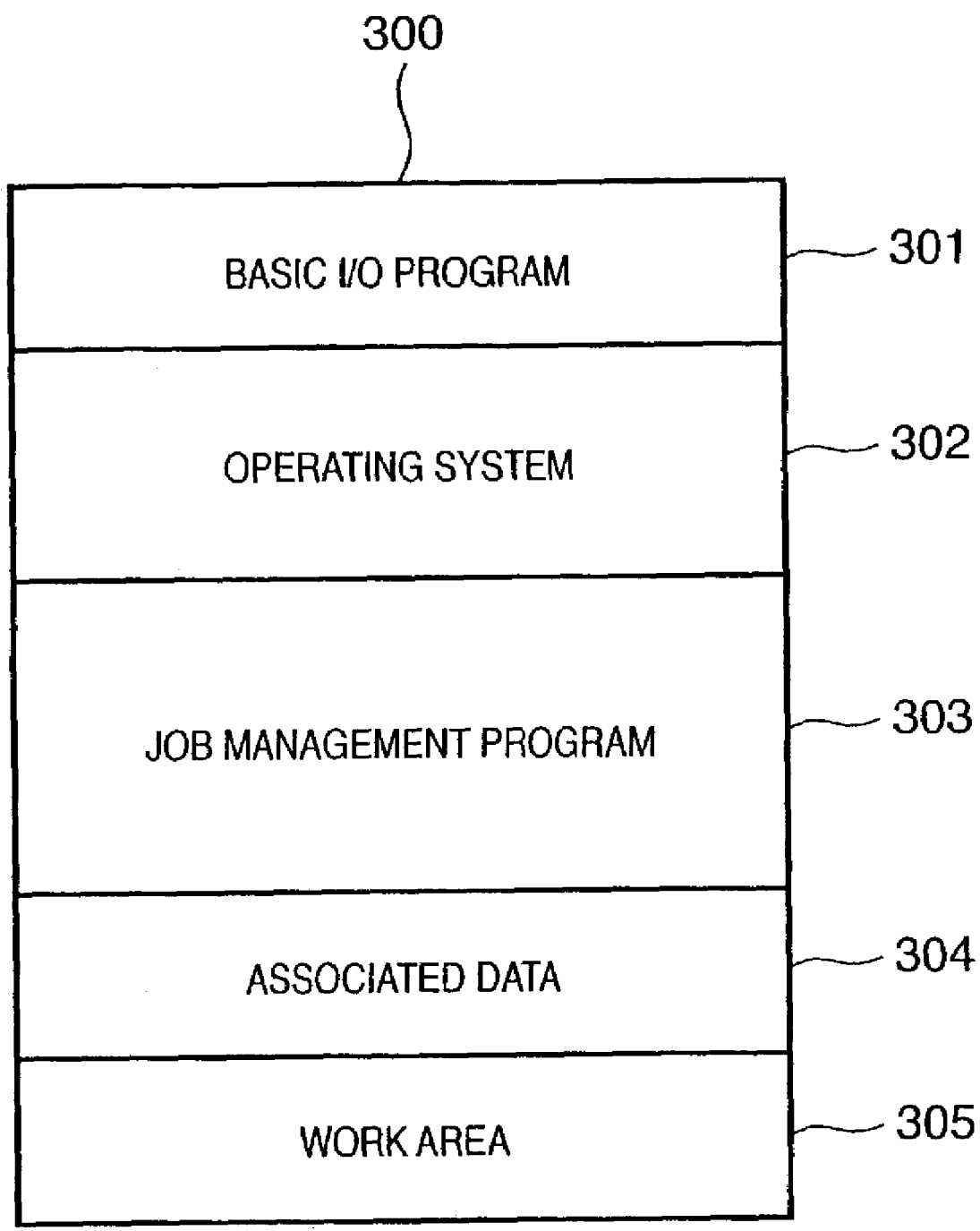
FIG. 3 is a view showing a memory map when a job management program is loaded into a RAM and can be executed by a CPU in the job account system according to the embodiment of the present invention.

FIG. 3 is a view showing a memory map when a job management program for setting a printer use limitation is loaded into the RAM 203 and can be executed by the CPU 201. Reference numeral 301 denotes a basic I/O program; 302, an operating system such as a Windows system; 303, a job management program; 304, associated data; and 305, a work area used to execute a program such as the job management program by the CPU 201.

Figure 4:
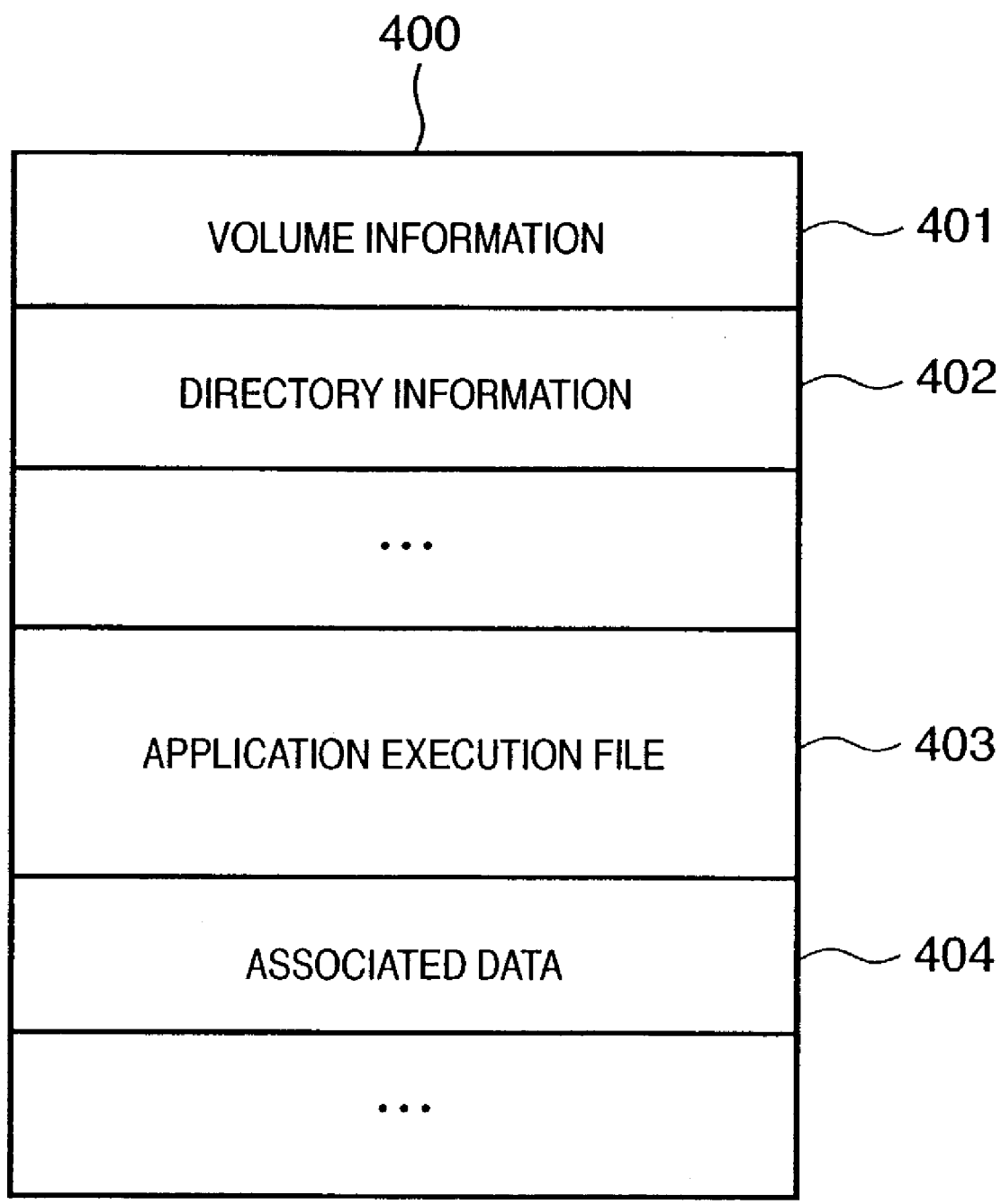
FIG. 4 is a view showing a memory map when the job management program and associated data are stored in an FD or CD-ROM in the job account system according to the embodiment of the present invention.

The job management program and associated data are stored in a floppy disk (FD) or CD-ROM, and supplied to the computer from the FD or CD-ROM. FIG. 4 is a view showing a memory map in a state wherein the job management program and associated data are stored in the FD or CD-ROM. A memory area 400 of the FD or CD-ROM is formed from volume information 401, directory information 402, a job management program execution file 403, and a job account-associated data file 404.

Figure 5:
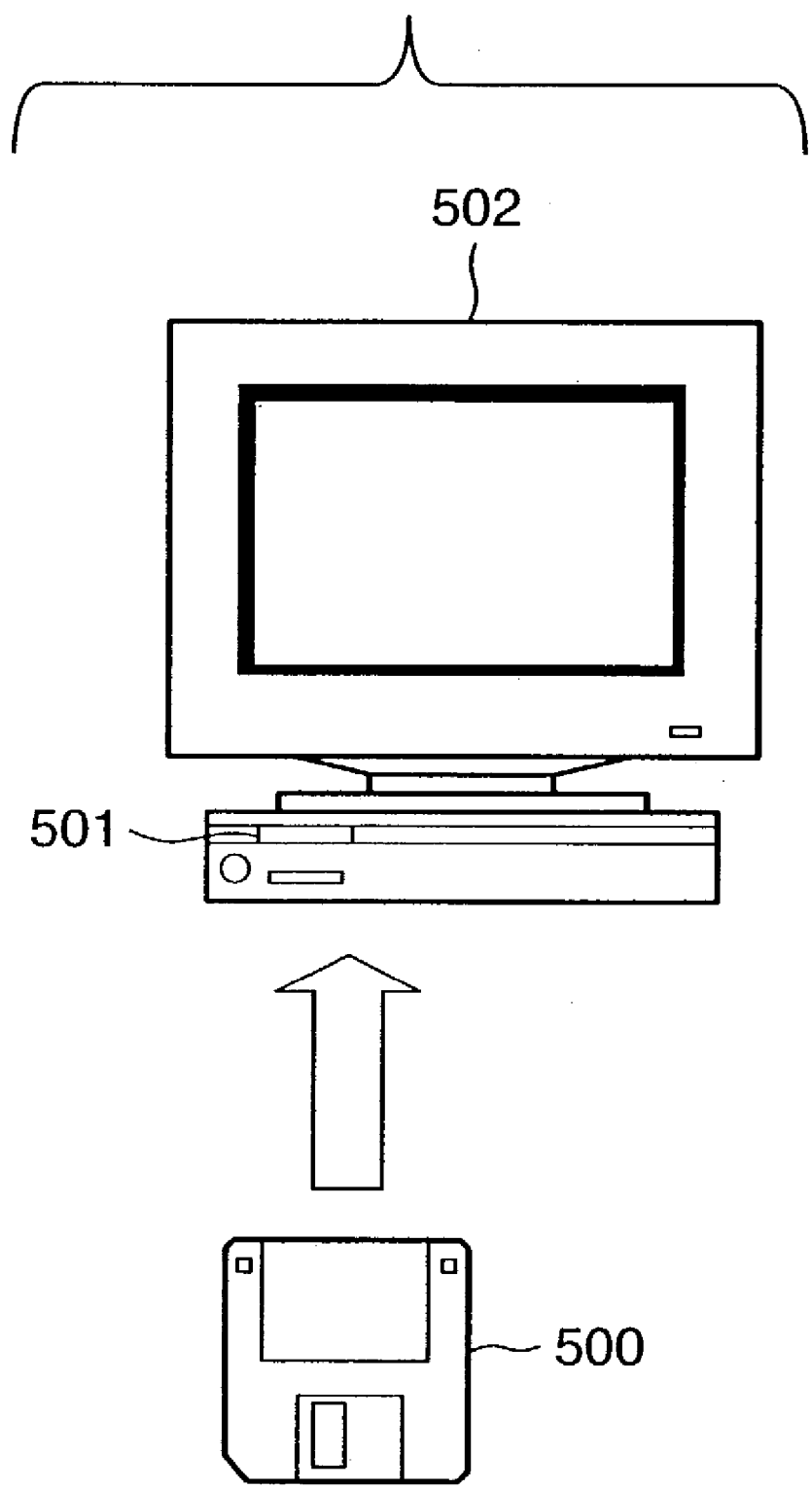
FIG. 5 is a view for explaining a method of supplying the program and data shown in FIG. 4 to a computer.

The object of the present invention is achieved when a storage medium (FIG. 4) which stores the program codes of the job management program is supplied to the computer, as shown in FIG. 5, and the computer device (CPU 201) reads out and executes the program codes stored in the storage medium.

The program and data shown in FIG. 4 are generally supplied by storing them in a floppy disk FD 500 and supplying the floppy disk FD 500 to a computer main body 502 (via a floppy disk drive 501), as shown in FIG. 5. In this case, the program codes read out from the storage medium realize the functions of this embodiment, and the storage medium which stores the program codes constitutes the present invention.

The storage medium for supplying the program codes includes an optical disk, magnetooptical disk, CD-ROM, CD-R, magnetic tape, nonvolatile memory card, and ROM, in addition to the floppy disk and hard disk. The functions of the embodiment are realized when the computer executes the readout program codes. Also, the functions of the embodiment are realized when an OS (Operating System) running on the computer performs part or all of actual processing on the basis of the instructions of the program codes. The functions of the embodiment are also realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

<Control Arrangement of Peripheral Device>

Figure 6:
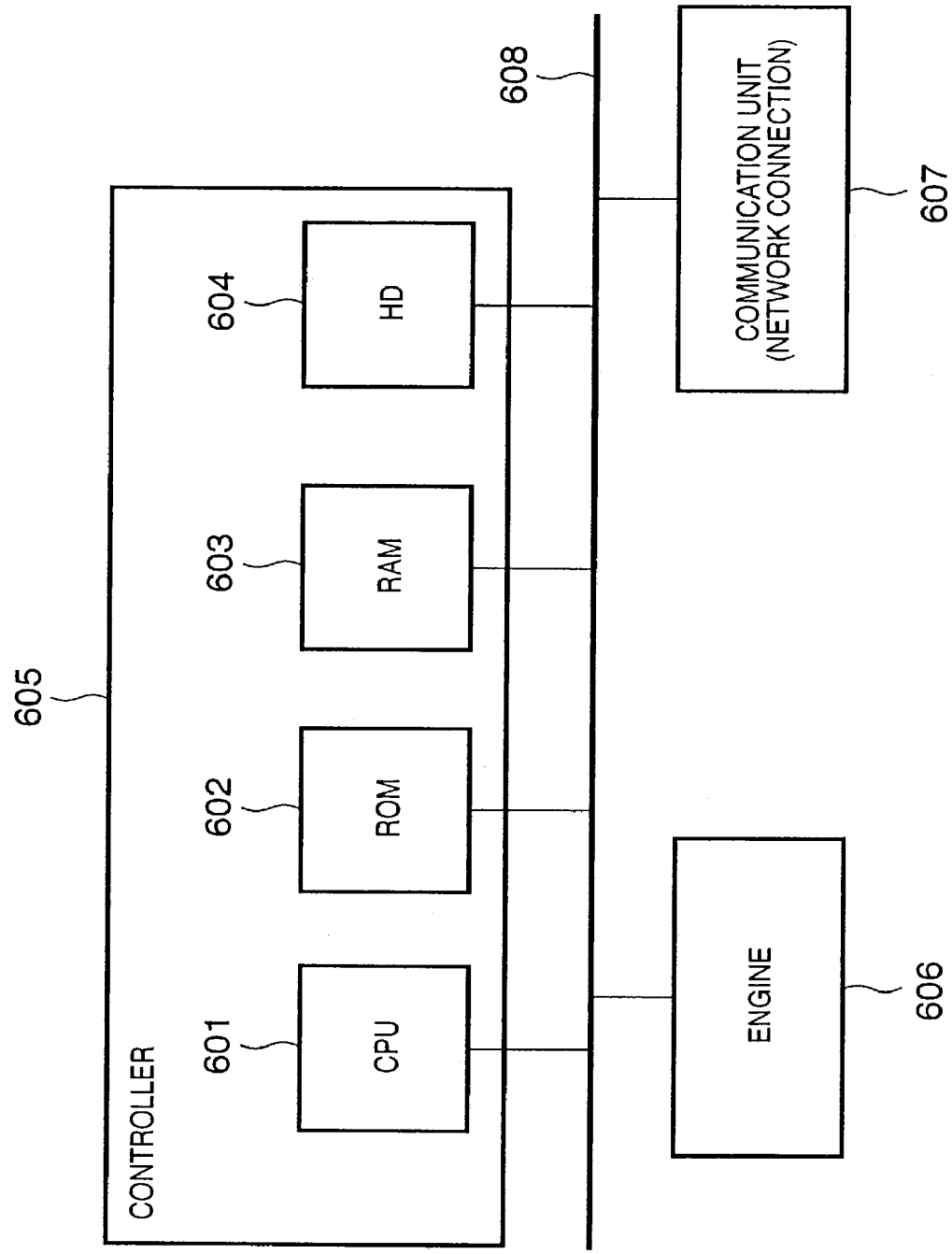
FIG. 6 is a block diagram showing the schematic arrangement of a peripheral device in the job account system according to the embodiment of the present invention.

FIG. 6 is a block diagram showing the schematic arrangement of a peripheral device. Reference numeral 605 denotes a controller which controls the entire peripheral device. The controller 605 comprises a CPU 601, ROM 602, RAM 603, and HD 604.

The CPU 601 performs control of the whole controller and peripheral device, arithmetic processing, and the like. The ROM 602 is a read-only memory as a memory area which stores a system startup program and the like. The RAM 603 is a random access memory as a data memory area. The HD 604 is a hard disk and can be replaced with another nonvolatile memory such as an SRAM. A peripheral device having the job log holding function stores a job log in the RAM 603 or HD 604. An operating system, communication control program, and engine control program are loaded into the RAM 603 and executed by the CPU 601.

Reference numeral 606 denotes a peripheral device engine which performs printing operation and image read operation under the control of the controller. The engine is formed from either or both of a printer engine and scanner unit.

Reference numeral 607 denotes a communication unit which controls network communication. The communication unit 607 allows the peripheral device to communicate with a client computer and server computer. Reference numeral 608 denotes a system bus. Data exchanged between these building components pass through the system bus 608.

<Job Management Processing>

Figure 7:
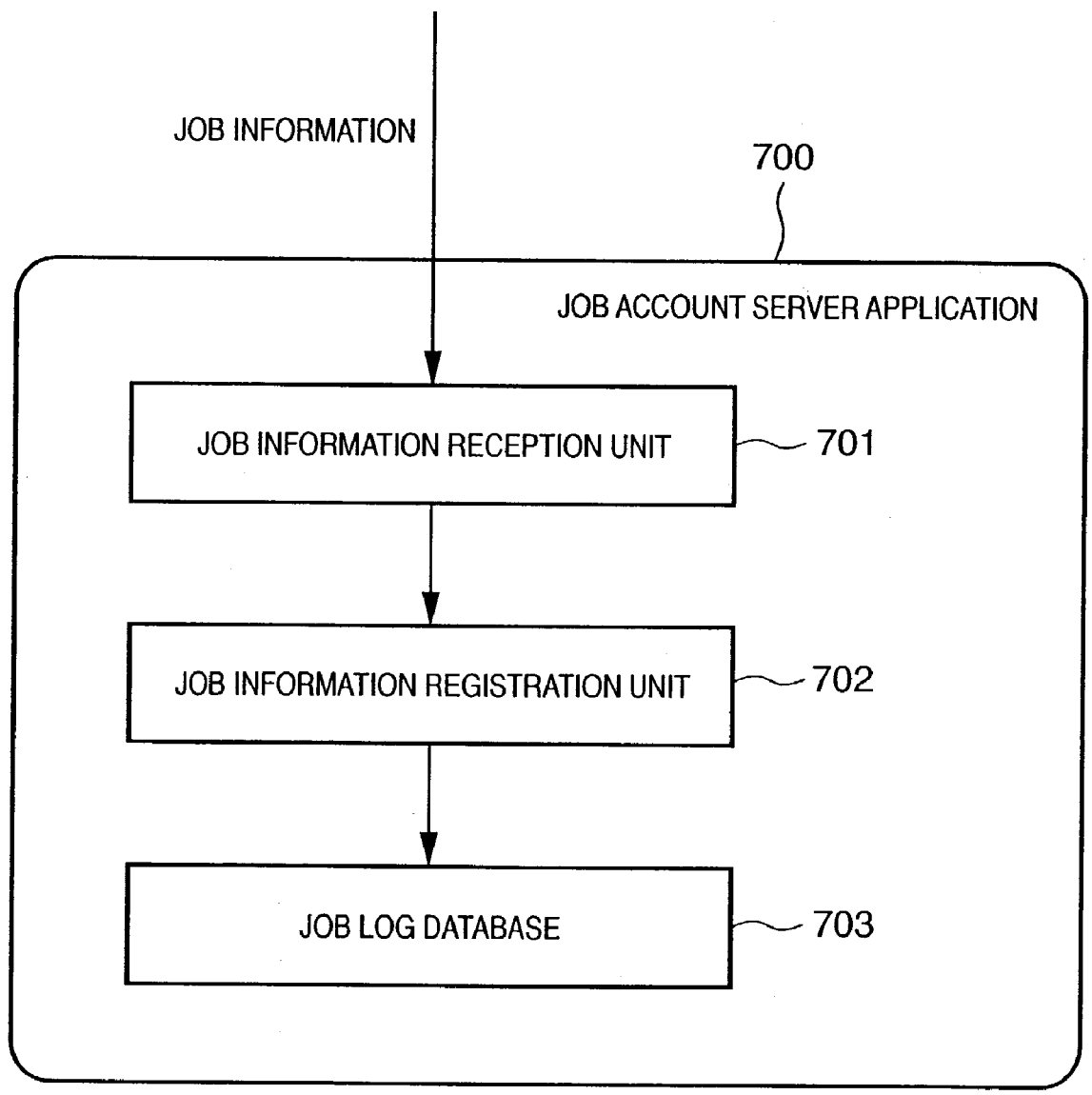
FIG. 7 is a view showing the functional arrangement of a job information management module in the job account system according to the embodiment of the present invention.

FIG. 7 is a view showing the functional arrangement of the job information management module 1031c of the job account server application 1031. A job information reception unit 701 acquires pieces of job information via the network from the job account client applications 1014 and 1024, and the peripheral devices 1040 and 1050 having the job log holding function. A job information registration unit 702 registers the pieces of job information received by the job information reception unit 701 in a job log database 703.

The job execution time, user, peripheral device, and job execution amount (the number of pages, the number of sheets, and the type of sheet) can be determined by referring to data in the job log database 703, and a detailed job account can be achieved.

<Processing by Application>

Figure 8:
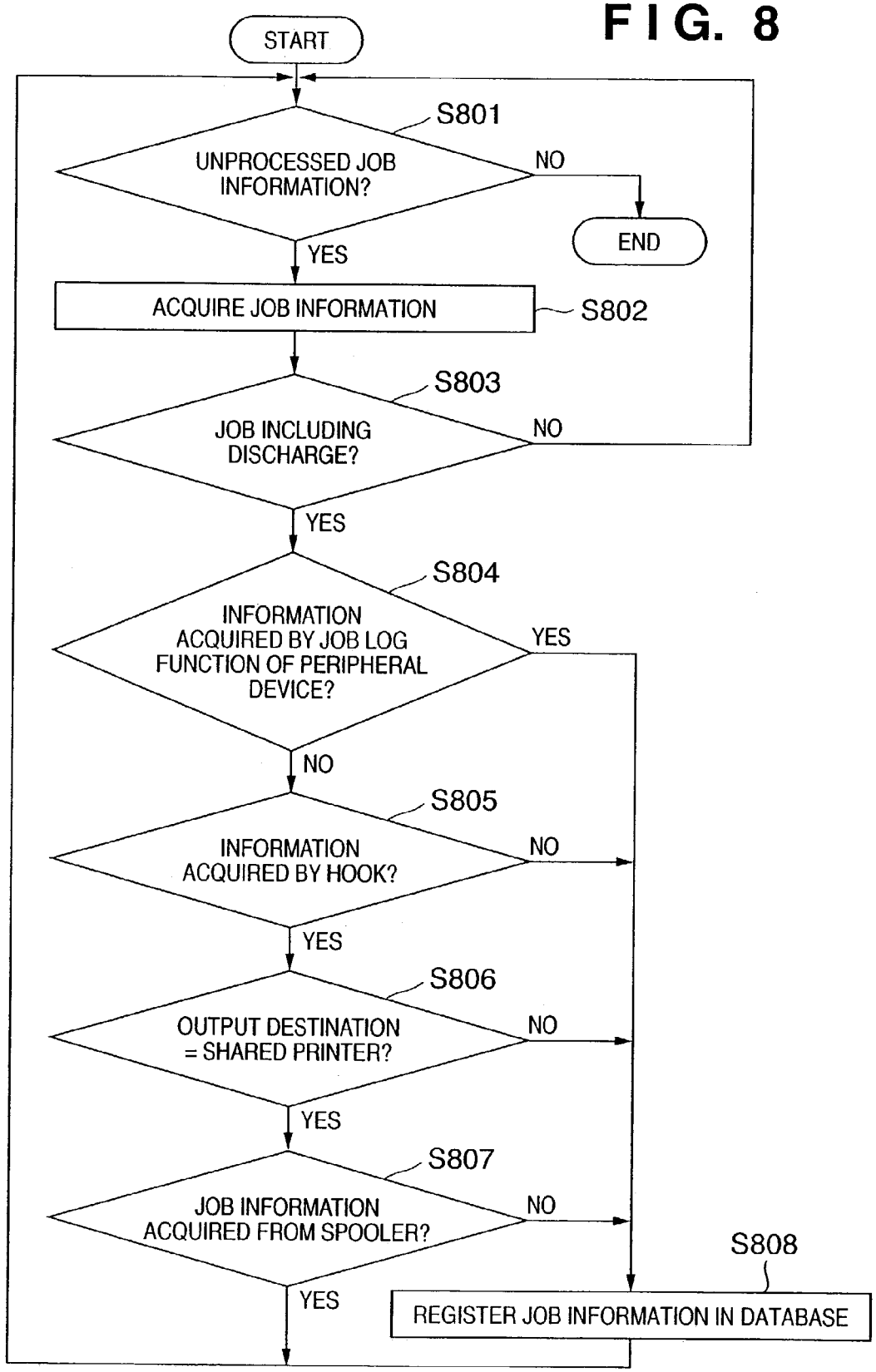
FIG. 8 is a flow chart showing processing when a job registration unit in the job account system according to the embodiment of the present invention registers job information received by a job reception unit in a job log database.

FIG. 8 is a flow chart showing processing when the job registration unit 702 registers job information received by the job reception unit 701 in the job log database 703. Whether unprocessed job information exists in the job reception unit 701 is determined. If NO in step S801, the processing ends; if YES, job information is acquired from the job reception unit 701 in step S802. In step S803, whether the acquired job information represents that the job includes discharge is determined. If NO in step S803, the processing returns to step S801; if YES, the processing shifts to step S804.

Processing from steps S804 to S808 is processing of registering job information in the database. In FIG. 1, when the client computer 1020 functions as the print server of the client computer 1010, job information generated by the client computer 1010 may be transmitted to the job account server application 1031 from both the job account client applications 1014 and 1024. To prevent registration of repetitive job information in the job log database 703, filtering is executed in steps S804 to S807.

In step S804, whether the job information has been acquired from a peripheral device is determined. If YES in step S804, the processing advances to step S808 to register the job information because of no repetitive registration. If NO in step S804, whether the job information has been acquired by a hook is determined in step S805.

Whether job information has been acquired by a hook can be determined by determining an OS which has acquired the job information. This is because whether job information has been acquired by a hook can be determined depending on the type of OS. For example, when the client computer 1010 uses OS 1, the client computer 1020 uses OS 2, and job information is acquired by OS 1, the job information is acquired by a hook. When job information is acquired by OS 2, the job information is acquired by the spooler 1023.

If NO in step S805, the processing advances to step S808 to register the job information because of no repetitive registration. If YES in step S805, whether the output destination of the job concerning the job information is a shared printer is determined in step S806. If NO in step S806, the processing advances to step S808 to register the job information because of no repetitive registration.

If YES in step S806, whether the job information has been acquired from the spooler of a client computer (e.g., the client computer 1020) serving as a print server which manages the shared printer is determined in step S807. If NO in step S807, the processing advances to step S808 to register the job information because of no repetitive registration.

If the job information has been acquired from the spooler, the processing returns to step S801.

In step S808, the job information is registered in the job log database 703.

FIG. 9 shows an example of one job information registered in the job log database 703. The database is formed from items and the contents of the items. An item 901 represents a job output device, i.e., a peripheral device which has processed a job. For a job including no discharge, a content representing a file name (original scanning), facsimile transmission, or a job including no discharge is stored.

An item 902 represents a job information acquisition method. The job information acquisition method includes acquisition by the hook, acquisition from the spooler, and acquisition from the job log holding function.

An item 903 represents job start time or end time. An item 904 represents the type of discharged sheet. An item 905 represents the number of output pages. An item 907 represents the number of discharged copies. The item 907 represents whether a job is supplied from a client computer to a shared printer. An item 908 represents the user name of a job issuer. An item 909 represents information for identifying whether the job is a color or monochrome printing job.

<Print Processing Flow>

Figure 10:
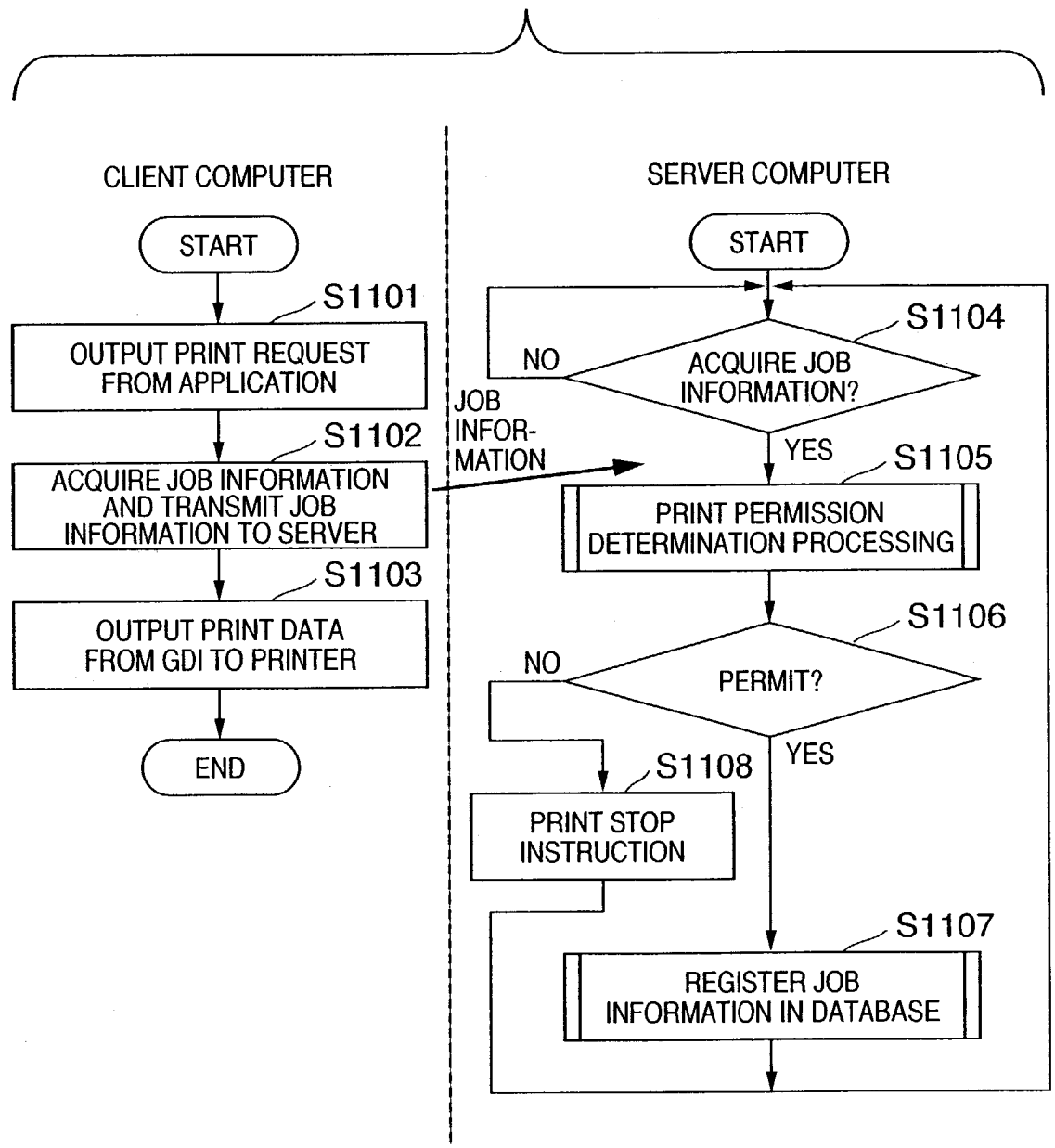
FIG. 10 is a flow chart showing processing in a job account server computer and job account client computer.

FIG. 10 is a flow chart for explaining a processing flow executed in the client computer 1010 and server computer 1030.

In step S1101, the user designates printing via the application 1011 of the client computer 1010. The application 1011 edits a document, image, or the like in accordance with the user designation, and outputs a print request. In step S1102, the job account client application 1014 acquires (or hooks) the print request from the application 1011, determines which print request is output, and acquires it as job information. The job information is transmitted to the job information management module 1031c of the server computer 1030.

In step S1103, the GDI 1012 receives the print request from the application 1011, and outputs print data to the printer 1060 via the spooler 1013.

If the job information management module 1031c receives the job information in step S1104, the server computer 1030 advances to step S1105 to perform print permission determination processing. If printing is permitted in step S1106, the server computer 1030 advances to step S1107 to add this print processing as printing log information to a memory (not shown). If NO in step S1106, the server computer 1030 advances to step S1108 to transmit a print stop instruction to the printer or client computer.

<Job Management Processing>

Job management processing in the server computer 1030 will be explained with reference to FIGS. 11A to 11D and 12.

FIGS. 11A to 11D are views showing an example of a setting window for imposing a job limitation. The use of a job management program allows displaying a dialog in FIG. 11A and setting various limitations.

A threshold for imposing a limitation, i.e., an upper limit value is set in the dialog of FIG. 11A. This dialog has a group name input column 101 for specifying a user on whom a limitation is imposed, an upper color limit value input column 102 for inputting the number of sheets by which the user is permitted to perform color printing, an upper monochrome limit value input column 103 for inputting the number of sheets by which the user is permitted to perform monochrome printing, a setting button 104 for determining pieces of information input to these columns, and a cancel button 105 for closing the dialog without determining these pieces of information.

After pieces of information are input to all the columns in FIG. 11A and the setting button 104 is clicked, a dialog in FIG. 11B is displayed. The dialog in FIG. 11B has a box 106 for selecting whether to permit printing, to permit printing and send warning mail, or not to permit printing in response to a color printing instruction for the number of sheets exceeding the number of sheets input to the upper color limit value input column 102. This dialog also has an OK button 107 for determining information input to the box 106, and a cancel button 108 for closing the dialog without any determination.

After any box is determined and the OK button 107 is clicked in FIG. 11B, a dialog in FIG. 11C is displayed. The dialog in FIG. 11C has a box 109 for selecting whether to permit printing, to permit printing and send warning mail, or not to permit printing in response to a monochrome printing instruction for the number of sheets exceeding the number of sheets input to the upper monochrome limit value input column 103. This dialog also has an OK button 110 for determining information input to the box 109, and a cancel button 111 for closing the dialog without any determination.

After any box is determined and the OK button 110 is clicked in FIG. 11C, a dialog in FIG. 11D is displayed. The dialog in FIG. 11D displays a message about the completion of setting, and a message about input settings.

FIGS. 11A to 11D show an example in which a given user (planning department) is permitted to print up to 100 sheets for each of color printing and monochrome printing, and even if printing exceeds a set upper limit value, printing is permitted for only monochrome print contents.

Note that limitations can be set for both color printing and monochrome printing in this example, but the present invention is not limited to this. It is also possible to always limit the use of color printing by the upper limit value, and decide whether to impose a use limitation for only monochrome printing on the basis of the check of a check box.

Figure 12:
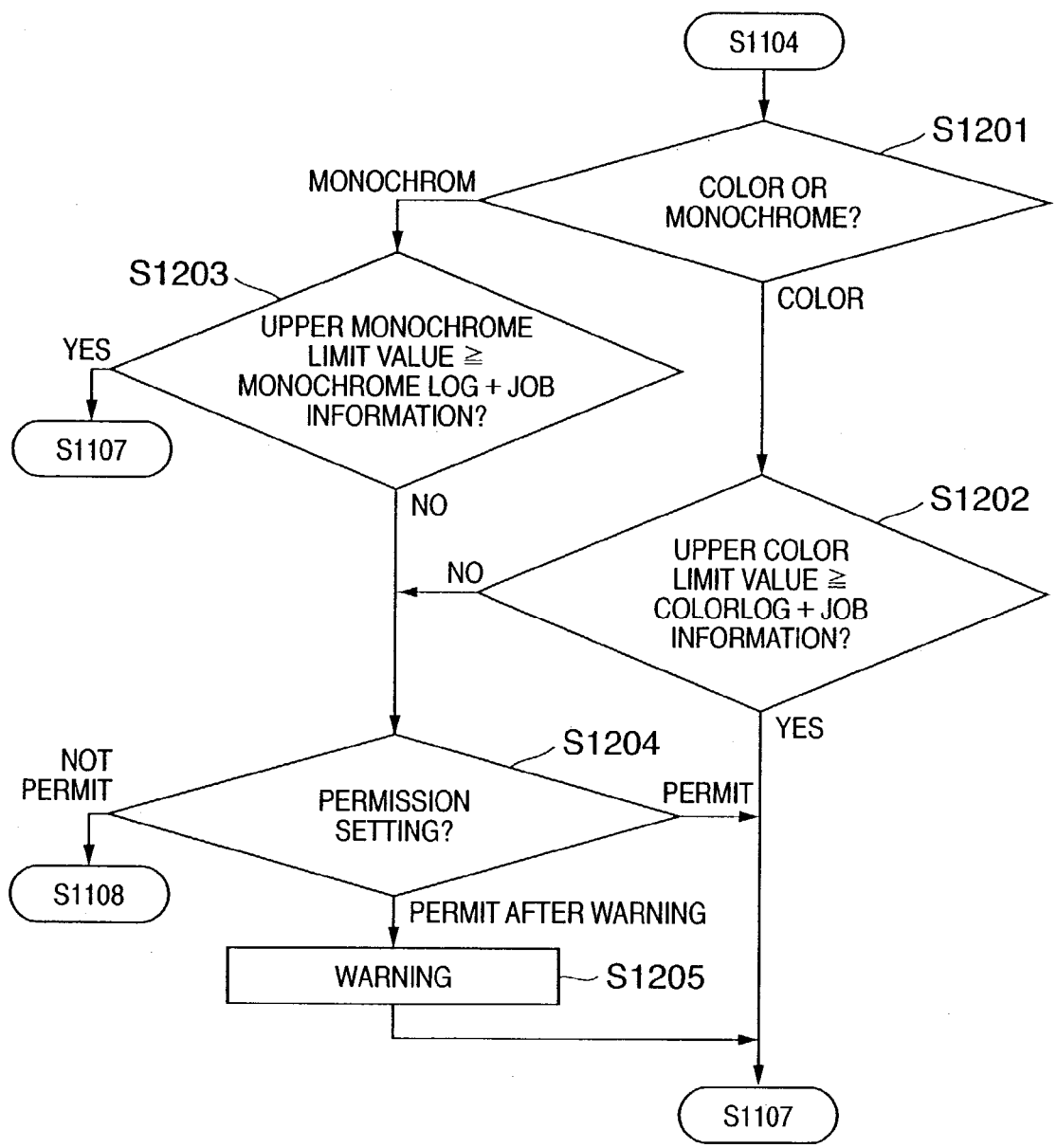
FIG. 12 is a flow chart for explaining detailed processing of print permission determination processing in FIG. 10.

FIG. 12 is a flow chart showing processing executed in step S1105 of FIG. 10 in detail.

In step S1201, whether the print content is color or monochrome is determined on the basis of job information acquired from the job account client application. If the print content is determined to be color, the flow shifts to step S1202; if the print content is determined to be monochrome, to step S1203.

In step S1202, the upper color limit value is compared with the sum of the cumulative number of printed sheets in color printing log information and the number of pieces of acquired job information. If the sum exceeds the upper limit value, the flow shifts to step S1204; if NO, the flow shifts to step S1107 in FIG. 10 to register job information in the database.

Also in step S1203, the upper monochrome value is compared with the sum of the number of sheets in monochrome printing log information and the number of pieces of acquired job information. If the sum exceeds the upper limit value, the flow shifts to step S1204; if NO, the flow shifts to step S1107 in FIG. 10 to register job information in the database.

In step S1204, the server computer 1030 determines, on the basis of settings using the setting windows of FIGS. 11A to 11D, whether a setting of inhibiting print processing corresponding to a printing mode recognized in step S1202 or S1203 has been made and whether to mail a notification that printing has exceeded the upper limit value. The server computer 1030 executes processing based on the determination result. More specifically, the server computer 1030 refers to setting contents shown in FIGS. 11A to 11D, and if "permit" is set, advances to step S1107 of FIG. 10. If "permit after warning" is set, the server computer 1030 shifts to step S1205, and after warning processing, to step S1107 of FIG. 10. If "not permit", i.e., inhibition of print processing is set, the server computer 1030 shifts to step S1108 of FIG. 10 and transmits a print stop instruction.

In this embodiment, different permission settings can be done for color printing and monochrome printing. However, the present invention is not limited to this and can be variously modified such that different permission settings can be done for respective sheet sizes.

In this embodiment, the limited number of sheets for limiting the use of an image forming apparatus is independently set for each of color printing and monochrome printing. Processing when printing exceeds the limited number of sheets can also be independently set.

It is also possible to always limit the use of color printing by the upper limit value, and determine whether to impose a use limitation for only monochrome printing on the basis of the check of a check box. More specifically, when color printing exceeds its upper limit value, printing is inhibited. As for monochrome printing, print processing continues while a warning is generated by mailing a notification that printing has exceeded the upper limit value. With these settings, there can be provided a system which realizes convenient print limitations such that high-cost color printing is reliably inhibited to reduce the cost, and as for monochrome printing relatively lower in cost than color printing, printing can continue even if printing exceeds the limited number of sheets. Since these print limitation conditions and print limitation contents can be designated and input on the setting window, fine print limitations can be visually realized by user-friendly operation.

As a matter of course, limitations can be set not only for users, but also for functions, user departments, or devices used (individually or at once). As printing log information to be referred to, not only the number of sheets, but also the use fee and the number of pages can be set. It is also possible to set not to permit printing regardless of whether the print content is color or monochrome. It is also possible not to set any limitation information.

When the use of a peripheral device exceeds a set limitation, whether the job is a color or monochrome job may be determined based on job information, and a limitation may be imposed on only a color job.

If it is set not to permit printing exceeding the limitation and a print request exceeding the limitation is issued, a message that printing has exceeded the limitation may be printed.

The above embodiment has exemplified a case wherein limitations are imposed on printing using an image forming apparatus such as a printer, copying machine, or MFP. However, the present invention is not limited to this, and can also be applied to a case wherein a use limitation is imposed on an image processing apparatus such as a scanner. That is, the present invention includes an information processing server capable of setting the scanning limited number of sheets using a scanner and setting processing (e.g., scanning inhibit processing or warning processing) performed upon reception of a request for scanning exceeding the scanning limited number of sheets.

The present invention can provide an information processing apparatus and information processing system capable of finely setting a use limitation, a control method, a control program, and a storage medium.

The present application claims priority from Japanese Patent Application No. 2002-076756, which is incorporated herein by reference.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for managing printing of an image processing apparatus which prints data received from the information processing apparatus in color and monochrome modes, the information processing apparatus comprising:
    inputting means for inputting user information;
    first setting means for setting, with respect to the input user information, a first number of sheets permitted to be printed in the color mode by the image processing apparatus and a second number of sheets permitted to be printed in the monochrome mode by the image processing apparatus;
    second setting means for selectively setting a first operation which is performed when the first number of sheets is exceeded in the color mode by a user specified by the input user information, the first operation being selected among inhibiting use of the image processing apparatus in the color mode without notifying the user, permitting the use in the color mode while notifying the user, and permitting the use in the color mode without notifying the user; and
    third setting means for selectively setting a second operation which is performed when the second number of sheets is exceeded in the monochrome mode by a user specified by the input user information, the second operation being selected among inhibiting use of the image processing apparatus in the monochrome mode without notifying the user permitting the use in the monochrome mode while notifying the user, and permitting the use in the monochrome mode without notifying the user.

2. The apparatus according to claim 1, further comprising:
    first determination means for determining whether the use of the image processing apparatus exceeds the first number of sheets in the color mode;

second determination means for determining whether the use of the image processing apparatus exceeds the second number of sheets in the monochrome mode; and control means for controlling the image processing apparatus so as to inhibit the use in the color or monochrome mode or to permit the use while notifying the user as set in the second and third setting means, when it is determined that the use of the image processing apparatus exceeds the first or second number of sheets in the color or monochrome mode.

3. The apparatus according to claim 1, wherein the image processing apparatus includes one of a printer, a copying machine, a scanner, and a multifunctional peripheral.

4. A method for managing an image processing apparatus for managing printing of an image processing apparatus which prints data received from the information processing apparatus in color and monochrome modes, the method comprising:

a step for inputting user information;

a first setting step for setting, with respect to the input user information, a first number of sheets permitted to be printed in the color mode by the image processing apparatus and a second number of sheets permitted to be printed in the monochrome mode by the image processing apparatus;

a second setting step for selectively setting a first operation which is performed when the first number of sheets is exceeded in the color mode by a user specified by the input user information, the first operation being selected among inhibiting use of the image processing apparatus in the color mode without notifying the user, permitting the use in the color mode while notifying the user, and permitting the use in the color mode without notifying the user; and a third setting step for selectively setting a second operation which is performed when the second number of sheets is exceeded in the monochrome mode by a user specified by the input user information, the second operation being selected among inhibiting use of the image processing apparatus in the monochrome mode without notifying the user, permitting the use in the monochrome mode while notifying the user, and permitting the use in the monochrome mode without notifying the user.

5. The method according to claim 4, further comprising:

a first determination step for determining whether the use of the image processing apparatus exceeds the first number of sheets in the color mode a second determination step for determining whether the use of the image processing apparatus exceeds the second number of sheets in the monochrome mode; and a control step for controlling the image processing apparatus so as to inhibit the use of the image processing apparatus in the color or monochrome mode or to permit the use while notifying the user as set in the second and third setting steps, when it is determined that the use of the image processing apparatus exceeds the first or second number of sheets in the color mode or the monochrome mode.

6. The method according to claim 4, wherein the image processing apparatus is one of a printer, a copying machine, a scanner, and a multifunctional peripheral.

7. A computer readable medium storing a computer program which executes the method according to claim 4.

* * * * *

UNITED STATES PATENT AND TRADEMARK OFFICE
CERTIFICATE OF CORRECTION

| | |
|---|---|
| PATENT NO. | : 7,426,045 B2 |
| APPLICATION NO. | : 10/390887 |
| DATED | : September 16, 2008 |
| INVENTOR(S) | : Jun Horiyama |

It is certified that error appears in the above-identified patent and that said Letters Patent is hereby corrected as shown below:

SHEET 12:

Figure 12, "MONOCHROM" should read --MONOCHROME--.

COLUMN 3:

Line 25, "suffices to" should read --need only--.

COLUMN 5:

Line 49, "magnetooptical" should read --magneto-optical--.

COLUMN 8:

Line 61, "the check of" should read --a check in--.

COLUMN 9:

Line 29, "permit", i.e., inhibition of print processing" should read --permit" (i.e., inhibition of print processing)--;
Line 34, "variously" should be deleted; and
Line 35, "modified" should read --modified in a variety of ways--.

COLUMN 10:

Line 60, "user" should read --user,--.

UNITED STATES PATENT AND TRADEMARK OFFICE
CERTIFICATE OF CORRECTION

PATENT NO.         : 7,426,045 B2
APPLICATION NO.  : 10/390887
DATED              : September 16, 2008
INVENTOR(S)        : Jun Horiyama It is certified that error appears in the above-identified patent and that said Letters Patent is hereby corrected as shown below:

<u>COLUMN 12</u>:

Line 15, "mode" should read --mode;--.

Signed and Sealed this

Twenty-fourth Day of February, 2009

JOHN DOLL
*Acting Director of the United States Patent and Trademark Office*